(12) United States Patent
Dessales et al.

(10) Patent No.: US 11,451,264 B2
(45) Date of Patent: Sep. 20, 2022

(54) WIRELESS COMMUNICATIONS SYSTEM

(71) Applicant: Schneider Electric Industries SAS, Rueil-Malmaison (FR)

(72) Inventors: Denis Dessales, Marillac-le-Franc (FR); Francis Chauvet, Mouthiers (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 17/213,303

(22) Filed: Mar. 26, 2021

(65) Prior Publication Data

US 2021/0314027 A1     Oct. 7, 2021

(30) Foreign Application Priority Data

Apr. 1, 2020   (FR) ........................ 2003238

(51) Int. Cl.
| | |
|---|---|
| *H04B 5/00* | (2006.01) |
| *H04W 84/20* | (2009.01) |
| *H02J 3/34* | (2006.01) |
| *H01F 38/14* | (2006.01) |

(52) U.S. Cl.
CPC ......... *H04B 5/0031* (2013.01); *H04B 5/0012* (2013.01); *H04B 5/0075* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 4,142,178 | A | 2/1979 | Whyte et al. | |
| 5,404,570 | A | 4/1995 | Charas et al. | |
| 6,496,105 | B2 * | 12/2002 | Fisher | H04L 12/10 340/310.17 |
| 6,993,317 | B2 * | 1/2006 | Belsak, Jr. | H04B 3/58 370/441 |
| 7,046,124 | B2 * | 5/2006 | Cope | H04B 3/56 340/310.17 |
| 7,170,367 | B2 * | 1/2007 | Cem | H01P 5/02 340/310.17 |

(Continued)

FOREIGN PATENT DOCUMENTS

| | | |
|---|---|---|
| EP | 2479646 A1 | 7/2012 |
| EP | 2781993 A2 | 9/2014 |

OTHER PUBLICATIONS

Search Report and Written Opinion dated Sep. 28, 2020 for French Patent Application No. FR2003238, 9 pages.

*Primary Examiner* — Tuan A Tran
(74) *Attorney, Agent, or Firm* — Locke Lord LLP

(57) ABSTRACT

A system for short-distance radio-frequency communications between a master module and a plurality of detachable slave modules, the communications system including a main electrical line connected to the master module and having a plurality of coupling points, wherein the communications system further includes a plurality of secondary electrical lines each having a first coupling area for a directional coupling between the secondary line and the main line at a coupling point, and a second coupling area for a directional coupling between the secondary line and a slave module, the second coupling area being distinct from the first coupling area.

13 Claims, 2 Drawing Sheets

(56) References Cited

U.S. PATENT DOCUMENTS

| | | | | |
|---|---|---|---|---|
| 7,224,243 B2* | 5/2007 | Cope | ........................ | H04B 3/56 333/100 |
| 7,307,512 B2* | 12/2007 | Yaney | ...................... | H04B 3/56 333/101 |
| 7,366,498 B2* | 4/2008 | Ko | ........................ | H04L 67/306 455/418 |
| 7,522,812 B2* | 4/2009 | Zitting | ..................... | H04B 3/56 340/854.9 |
| 7,778,514 B2* | 8/2010 | Zitting | ................... | H04B 3/542 340/538 |
| 7,876,174 B2* | 1/2011 | Radtke | ................. | G05B 13/021 333/100 |
| 8,198,999 B2* | 6/2012 | White, II | ................. | H04B 3/56 340/12.32 |
| 8,204,472 B2* | 6/2012 | Riveiro | .................... | H04B 3/56 307/3 |
| 8,504,748 B2* | 8/2013 | Matsuo | ................. | H04L 12/403 710/110 |
| 9,128,489 B2* | 9/2015 | Bauman | ............. | G05B 19/0421 |
| 9,690,725 B2* | 6/2017 | Sengoku | .................. | G06F 13/24 |
| 9,762,294 B2* | 9/2017 | Saitou | ...................... | H02J 50/12 |
| 9,934,186 B2* | 4/2018 | Fan | ........................ | G06F 1/266 |
| 9,998,175 B2* | 6/2018 | Sun | ........................ | H04B 3/56 |
| 10,044,442 B2* | 8/2018 | Yogeeswaran | ........... | H04B 3/52 |
| 10,290,419 B2* | 5/2019 | Cunningham | .......... | H02J 50/10 |
| 10,383,192 B2* | 8/2019 | Roberge | ..................... | H02J 3/34 |
| 10,819,392 B2* | 10/2020 | Barzegar | ............. | H04L 12/6418 |
| 10,826,562 B2* | 11/2020 | Barzegar | ................. | H04B 3/542 |
| 2008/0239984 A1* | 10/2008 | Le | ......................... | H04L 12/282 370/254 |
| 2008/0303344 A1* | 12/2008 | Matsuda | .................. | H04B 3/54 361/104 |
| 2011/0196541 A1* | 8/2011 | Bauman | .................. | G05D 7/06 700/3 |
| 2017/0237497 A1* | 8/2017 | Yogeeswaran | .......... | H04B 10/40 398/116 |
| 2019/0028146 A1 | 1/2019 | Morgan et al. | | |

\* cited by examiner

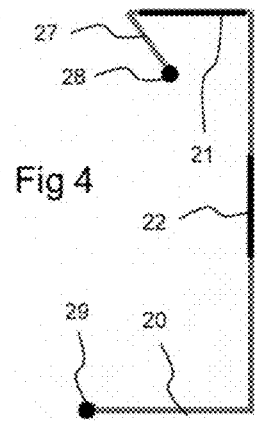
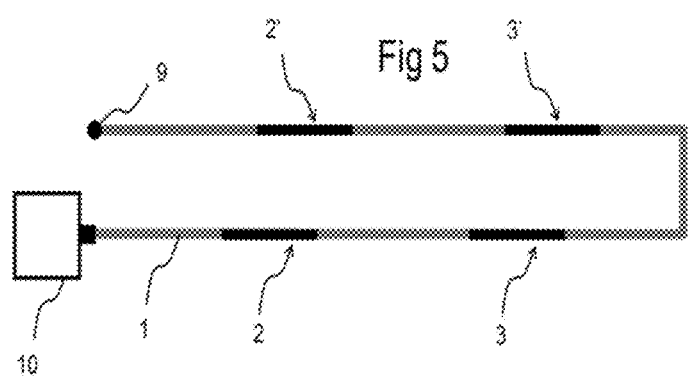

WIRELESS COMMUNICATIONS SYSTEM

TECHNICAL FIELD OF THE INVENTION

The present invention relates to a short-distance radio-frequency communications system allowing equipment to communicate with a plurality of detachable modules with the aid of a wireless link. This invention may in particular be applied to a modular man-machine dialogue system comprising a plurality of dialogue units communicating with a master module. These various dialogue units are for example push-buttons or switches, visual or acoustic signalling units (a lamp, a buzzer, etc.), sensors or detectors, etc.

PRIOR ART

Documents EP2479646 and EP2781993 already describe a modular system wherein a plurality of slave man-machine dialogue units may communicate with a master module. These dialogue units are designed to be mounted on a support module which may dialogue with the master module. The dialogue units are mounted detachably and interchangeably, which makes the solution easy to upgrade.

The link between the slave modules and the support module is wired and the link between the support module and the master module may be wired or wireless, by radio wave. However, the solutions described in these documents necessitate the use of the intermediary support module and, in the case of a wireless link, generate radio waves subject to interference, in particular if the dialogue units are mounted on a metal enclosure. Moreover, there may also be mutual interference between a plurality of modular systems or between a plurality of slave modules.

Other solutions based notably on NFC, RFID or Wilkinson power divider technologies are judged to be too expensive and too bulky for such an application and/or as having a data rate which may prove to be too low when it is desirable to manage a large number of slave modules.

One of the aims of the invention is therefore to find a simple, space-saving and economical solution for making a plurality of slave modules communicate directly with a master module by virtue of a wireless link, that is to say without electrical contact. The number of slave modules is advantageously variable, that is to say that it is at all times possible to very easily remove, replace or add one or more slave modules.

Another aim of the invention is to greatly limit the range of the wireless communications in order to avoid such a communications system interfering with the environment, in particular by the transmission of radio waves, to avoid it being interfered with by the environment, such as by transmitters that may be situated nearby (for example Wi-Fi transmitters), and also to avoid two systems side by side being able to interfere with each other.

DESCRIPTION OF THE INVENTION

To this end, the invention describes a system for radio-frequency communications between a master module and a plurality of detachable slave modules, the communications system including a main electrical line which is connected to the master module and which has a plurality of coupling points, characterized in that the communications system comprises a plurality of secondary electrical lines each having a first coupling area for a directional coupling between said secondary line and the main line at a coupling point, and a second coupling area for a directional coupling between said secondary line and a slave module, the second coupling area being distinct from the first coupling area.

According to one feature, the first coupling area and the second coupling area of each secondary line are rectilinear in shape, or have sawtooth shapes.

According to another feature, each secondary line has two terminators having line-end impedances equal to the characteristic impedance of said secondary line. The main line is connected at one end to the master module and at the other end to a line-end impedance suitable for being matched to the characteristic impedance of the main line.

According to another feature, the main line and the secondary lines are conductive tracks integrated in one and the same main printed circuit board. According to another feature, the main line and the secondary lines are situated in one and the same plane of the main printed circuit board.

According to another feature, the communications system also comprises a plurality of slave modules, and one slave module includes an auxiliary printed circuit board provided with a conductive track and which is placed above the main printed circuit board opposite the second coupling area when the slave module is in communications with the master module.

According to another feature, the length of the first coupling area and the length of the second coupling area depend on the working frequency of the radio line.

According to another feature, the directional couplings at the first coupling area and at the second coupling area are capacitive and inductive couplings.

BRIEF DESCRIPTION OF THE FIGURES

Other features will become apparent from the following detailed description, which is given with reference to the appended drawings, wherein:

FIG. 4 shows an alternative shape of a secondary line.

FIG. 5 shows an alternative shape of the main line.

With reference to FIG. 1, the aim of a short-distance wireless radio-frequency communications system is to make a master module 10 communicate with a plurality of slave modules 11, 11' in the context of an automation application. The master module 10 may for example be an automation device of programmable logic controller or microcontroller type having an electronic component (or chip) for radio transmission/reception. The communications between master and slaves may be performed according to various communications protocols, as long as these protocols have an adequate data rate for the desired application and a transmission frequency which does not require lengths of electric lines which are too great. For example, a protocol such as Bluetooth or Zigbee may be used the components of which are inexpensive, such as a BLE (Bluetooth Low Energy) component. The slave modules 11, 11' are for example man-machine dialogue units, of push-button or switch type, a visual or acoustic signalling unit (a lamp, a buzzer, etc.) and/or sensors or detectors, which also have a component for radio transmission/reception.

It is frequently desirable to upgrade an automation application by changing or adding man-machine dialogue units, depending for example on the needs of the user client.

Moreover, it is advantageous to be able to replace one unit with another for various reasons, notably for maintenance.

To obtain such a modular, upgradeable and easily modifiable system, the slave modules are mounted and connected detachably, that is to say that a slave module may be easily removed, replaced or added without interfering with the wireless communications between the master module 10 and the other slave modules.

Likewise, by virtue of the solution adopted in the invention, the presence or the absence of a slave module 11 on a location has no influence on the communications of the other slave modules with the master module 10.

Figure 1:
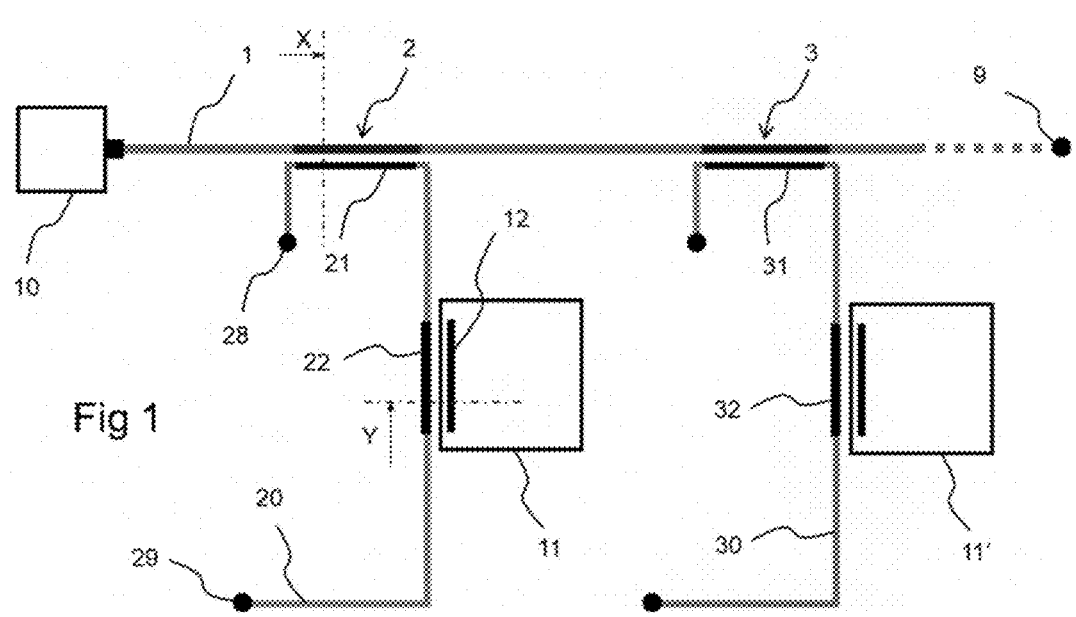
FIG. 1 shows a simplified diagram of a communications system according to the invention.

The communications system includes to this end a main electrical transmission line 1 which is connected on one side to the radio component of the master module 10 soldered on the printed circuit board 5 (for example with the aid of a metallized hole, referred to as a via), and on the other side to a terminator impedance 9 notably for avoiding the reflected waves. This main transmission line 1 has a plurality of coupling points 2, 3 which are positioned in various places along the main line 1. In FIG. 1, only a first coupling point 2 and a second coupling point 3 are shown for the sake of simplifying the diagram. The main line 1 is preferably produced by a conductive track which is placed inside a multilayer printed circuit board (or PCB: printed circuit board) as detailed below. The terminator impedance 9 is for example 50 ohms and the main line must also have a precise characteristic impedance, typically of 50 ohms. This characteristic impedance is essentially determined by the width and the thickness of copper of the track as well as the width of the dielectric of the PCB and its electrical permittivity.

FIG. 5 shows another embodiment of a main line 1 with a U-shaped conductive track having two lengths connected together, a first end of the U being connected to the master module 10 and the other end of the U to the terminator impedance 9. This allows more coupling points 2, 3, 2', 3' to be placed on the line 1 and therefore a greater number of slave modules to be connected in a small space. Other shapes for the main line 1 are quite obviously easily conceivable.

The communications system also comprises a plurality of secondary electrical transmission lines. FIG. 1 shows a first secondary transmission line 20 and a second secondary transmission line 30. Each secondary line 20 (or 30) has a first coupling area 21 (or 31) allowing a directional coupling to be produced with the main line 1 at a coupling point 2 (or 3).

Advantageously, the presence of secondary transmission lines (allowing the transmission of the radio communications between the slave modules and the master module), not electrically connected to the main line, provides a simple solution which allows mismatching of the main line (and therefore potentially unstable or variable performance) depending on the number and the presence or absence of slave modules connected to the communications system to be avoided.

Generally speaking, a directional coupling is a passive device which diverts a portion of a signal travelling through a primary transmission line to a secondary transmission line. In the present document, the expression "directional coupling" is used to mean that the coupling between two electrical lines close to one another in order to carry out the communications is performed capacitively and also inductively. These directional couplings are produced with electrical lines which are for example of "microstrip" or preferably "stripline" type.

In the embodiment shown, the main line and the secondary line are preferably rectilinear, substantially parallel to each other and at a small distance from one another at the coupling points 2, 3 and at the coupling areas 21, 31, so as to obtain a good coupling. However, instead of a rectilinear shape, other shapes are also possible, such as zig-zag or sawtooth shapes, which would allow the geometric length of these areas to be limited while preserving an electrical length which is satisfactory and compatible with the wavelength used.

Figure 2:
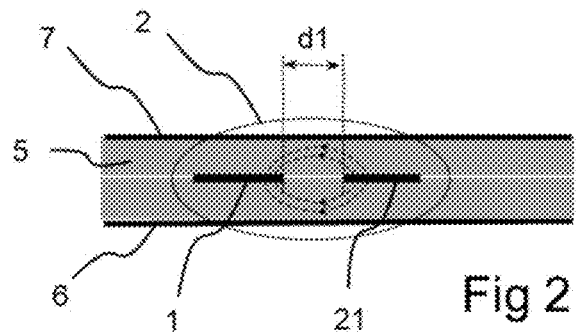
FIG. 2 details a sectional view along an axis X of the coupling between the main line and a secondary line.

FIG. 2 shows a cross-sectional view of the printed circuit board 5, referred to as the main printed circuit board, produced at the coupling point 2, along an axis X of FIG. 1. It can be seen that the main line 1 is situated in the same horizontal plane of the printed circuit board 5 as the coupling area 21 of the secondary line 20. Advantageously, the main line 1 and the secondary lines 20, 30 are conductive tracks integrated in the same printed circuit board 5, which simplifies the production of the communications system.

The main printed circuit board 5 is a multilayer printed circuit board and is composed of two external conductive tracks 6, 7 made of copper which are electrically connected to a zero potential (0 V) of the printed circuit board in order to form a screen and thus limit the propagation of the radio waves. The printed circuit board 5 also includes internal conductive tracks made of copper forming the main line 1 and the secondary lines 20, 30. The printed circuit board 5 may for example be manufactured from a standard PCB with four conductive layers, from which one of the two internal copper layers are removed by trimming, and wherein the thickness of the insulating layers, generally made from prepreg and from epoxy resin, is adapted in order for the remaining copper internal conductive track to be situated in the middle of the printed circuit board 5, that is to say substantially halfway between the external conductive tracks 6 and 7. By way of example, the thickness of the external conductive tracks may be 17 µm and that of the internal conductive tracks 35 µm, with a complete thickness of the printed circuit board of approximately 1.6 mm. Typically, at the coupling point 2, the first coupling area 21 has for example a length of 10 mm and the distance d1 between the main line 1 and the first coupling area 21 of the secondary line 20 is for example 0.7 mm.

Each secondary line 20 (or 30) also includes a second coupling area 22 (or 32) allowing a directional coupling to be produced between said secondary line and a slave module 11 (or 11') when the latter is present in the vicinity of this second coupling area.

Figure 3:
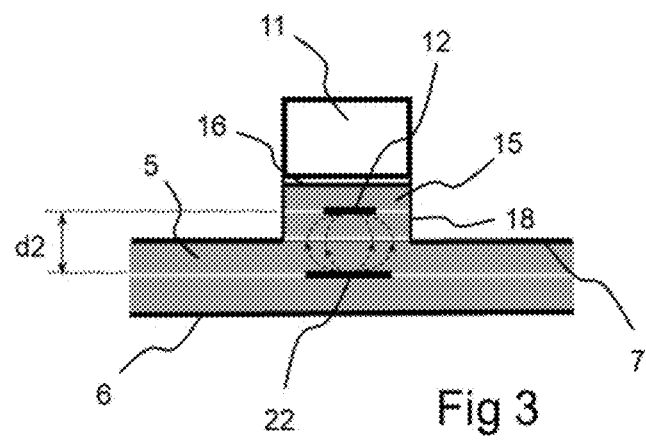
FIG. 3 details a sectional view along an axis Y of the coupling between a secondary line and a slave module.

FIG. 3 shows a cross-sectional view of the main printed circuit board 5 produced at the second coupling area 22 of the secondary line 20, along an axis Y of FIG. 1. Each slave module 11 includes a printed circuit board 15, referred to as an auxiliary printed circuit board, which has a, preferably rectilinear, internal conductive track 12 situated between two insulating layers of substantially equal thickness and made from prepreg and epoxy resin. A conductive layer 16 made of copper is placed on the upper portion of the auxiliary printed circuit board 15 of the slave module 11. However, in order to ensure an effective coupling between the internal conductive track 12 and the second coupling area 22, the lower portion of the auxiliary printed circuit board 15 does not include a conductive layer. Likewise, the main printed circuit board 5 does not include an upper metal layer 7 at the various second coupling areas 22, 32, over a surface area of approximately 10 mm by 10 mm, this surface area obviously being dependent on the size of the slave modules.

When it is desirable to connect a slave module 11 to the master module 10, it therefore suffices simply to place the slave module 11 on the main printed circuit board 5, such that the auxiliary printed circuit board 15 of the slave module 11 is situated just above the second coupling area 22 of the secondary line 20, which allows the internal conductive track 12 of the auxiliary printed circuit board 15 to be coupled with the second coupling area 22 of the secondary line 20. Thus, the radio communications between the master module 10 and the slave module 11 will be made on one hand through the directional coupling between the internal conductive track 12 and the second coupling area 22 and on the other hand through the directional coupling between the first coupling area 21 and the main line 1.

Contrary to what might be suggested by FIG. 1, which shows a simplified diagram showing an overview of the communications system, the internal conductive track 12 of the auxiliary printed circuit board 15 and the second coupling area 22 of the secondary line 20 are therefore in two distinct planes, while the main line 1 and the first coupling area 21 of the secondary line 20 are in one and the same plane, as detailed clearly in FIGS. 2 and 3.

Typically, the second coupling area 22 has for example a length of 10 mm and the distance d2 between the second coupling area 22 and the internal conductive track 12 is for example in the order of 1 mm. Moreover, the conductive track of the secondary line 20 is preferably wider at the coupling area 22. Generally speaking, it is clear that, the smaller the distance d2 and the greater the length and the width of the coupling area 22, the better the coupling will be. These various parameters may therefore be exploited to optimize the coupling with respect to existing dimensions and constraints.

In addition, in the embodiment of FIG. 3, in order to further improve the electrical continuity and compensate for the removal of the upper metal layer 7 at the second coupling area 22, the slave module 11 may be mounted in a metal housing which sits on top of the auxiliary printed circuit board 15 and which has two metal legs 18 on either side which come into contact with the upper metal layer 7, in order to form a screen when the slave module 11 is in place. The distance between the internal conductive track 12 and the slave module 11 may be in the order of 5 mm and the internal conductive track 12 is electrically connected to the radio component of the slave module 11, for example with the aid of a via in the auxiliary printed circuit board. An embodiment might also be conceived of with simple cut metal sheets, instead of the layers of copper connected to the 0 V.

The coupling areas thus serve as an antenna for the radio transmissions, which has the effect that the communications between master and slaves remain confined to the maximum at the various coupling points and coupling areas by virtue notably of the screens; the communications system does not interfere with and is not interfered with by the environment.

The slave modules 11, 11' may be supplied with electric power by various means which are not detailed in the present document, such as a cell/battery or a magnetic induction power supply. Note in addition that a magnetic induction power supply is implemented most of the time at a low frequency which is therefore far from the bands covered by the radio modules (e.g.: 2.4 GHz) and will therefore not generate interference with the communications system.

Each secondary line 20 must include terminators 28, 29 which are loaded with line-end impedances equal to the characteristic impedance of the secondary line, for example 50 ohms, so as to avoid the reflection of the waves within the transmission lines. FIG. 1 shows that each secondary line 20, 30 is made of a plurality of rectilinear segments which are connected end-to-end. In the described embodiment, it has been seen that the length of the first coupling area 21 and of the second coupling area 22 is in the order of 10 mm and their width is in the order of 1 mm. In addition, the length of the coupling area 22 of the secondary line 20 must be optimized taking into account the wavelength used for the radio communications, namely a working frequency of 2.4 GHz in the described embodiment, the thickness of the main printed circuit board 5, the dielectric parameters of the substrate and the width of the coupling areas. Typically a total length of approximately 3 cm for the secondary line 20 gives satisfactory results.

The configuration of the segments of each secondary line may take a plurality of different shapes and depends notably on the space available for the printed circuit board 5 and on the optimization of the various couplings. FIG. 4 shows an alternative secondary line 20 wherein one of the terminal segments 27 forms an acute angle with the first coupling area 21 and not a right angle as in the embodiment of FIG. 1, which has the advantage of a gain in potential space for passing other electrical tracks (not covered by the present communications system) over the same PCB printed circuit board.

The invention claimed is:

1. A communications system for radio-frequency communications between a master module and a plurality of detachable slave modules, the communications system comprising: a main electrical line which is connected to the master module and which has a plurality of coupling points, a plurality of secondary electrical lines each having a first coupling area for a directional coupling between said secondary line and the main line at a coupling point, and a second coupling area for a directional coupling between said secondary line and a slave module, the second coupling area being distinct from the first coupling area, wherein the main line and the secondary lines are conductive tracks integrated in one and the same main printed circuit board.

2. The communications system according to claim 1, wherein the first coupling area and the second coupling area of each secondary line are rectilinear in shape.

3. The communications system according to claim 1, wherein the first coupling area or the second coupling area of each secondary line have sawtooth shapes.

4. The communications system according to claim 1, wherein each secondary line has two terminators having line-end impedances equal to the characteristic impedance of said secondary line.

5. The communications system according to claim 1, wherein the main line is connected at one end to the master module and at the other end to a line-end impedance designed to be matched to the characteristic impedance of the main line.

6. The communications system according to claim 1, wherein the main line and the secondary lines are situated in one and the same plane of the main printed circuit board.

7. The communications system according to claim 1, further comprising a plurality of slave modules, wherein one slave module includes an auxiliary printed circuit board provided with a conductive track and which is placed above the main printed circuit board opposite the second coupling area when the slave module is in communications with the master module.

8. The communications system according to claim 1, wherein the length of the first coupling area and the length of the second coupling area depend on the working frequency of the radio line.

9. The communications system according to claim 1, wherein the master module and the slave modules communicate with each other through one of a Zigbee protocol or a Bluetooth protocol.

10. The communications system according to claim 1, wherein the directional couplings at the first coupling area and at the second coupling area are capacitive and inductive couplings.

11. The communications system according to claim 1, wherein a length of the second coupling area depends on a working frequency of the radio-frequency communications.

12. The communications system according to claim 11, wherein the working frequency is 2.4 GHz.

13. A communications system for radio-frequency communications between a master module and a plurality of detachable slave modules, the communications system comprising: a main electrical line which is connected to the master module and which has a plurality of coupling points, a plurality of secondary electrical lines each having a first coupling area for a directional coupling between said secondary line and the main line at a coupling point, and a second coupling area for a directional coupling between said secondary line and a slave module, the second coupling area being distinct from the first coupling area, wherein the master module and the slave modules communicate with each other through one of a Zigbee protocol or a Bluetooth protocol.

* * * * *